United States Patent Office 3,240,280
Patented Mar. 15, 1966

3,240,280
DRILLING AND/OR SERVICING OF WELLS
Charles A. Stratton, Copan, and Sidney Schiff, Bartlesville, Okla., assignors to Phillips Petroleum Company, a corporation of Delaware
No Drawing. Filed Dec. 26, 1962, Ser. No. 247,328
13 Claims. (Cl. 175—71)

This application relates to the drilling and/or servicing of wells. In one aspect this application relates to the drilling of wells or bore holes with a gas drilling fluid in the presence of water. In another aspect this invention relates to the servicing of wells to remove undesired water therefrom.

In the art of drilling wells to tap subterranean deposits, such as gas or oil, especially when drilling by the rotary method wherein cuttings must be removed from the bore hole, it is necessary to use a drilling fluid, as is well known to those skilled in the art. The especially prepared drilling fluid is pumped down a hollow drill string or stem within the bore hole, across the drill bit which is attached to the lower end of the drill stem, and is then normally circulated upwardly through the annular space between the drill stem and the bore hole wall. Circulation of the drilling fluid in this manner removes the cuttings from the bore hole, lubricates and cools the drill bit, seals the wall of the bore hole with a thin, impervious layer of solid material or filter cake, and applies a hydrostatic head to the formation to counterbalance formation pressures.

It is known that the above functions of liquid drilling fluids can be accomplished by using gas drilling fluids. Thus, gases such as compressed air, natural gas from a nearby producing well, and nitrogen have been used in the drilling of wells or bore holes. Where it is possible to so employ a gas drilling fluid, definite advantages such as higher penetration rates and longer bit life are obtained. Thus, it is highly desirable to employ gas drilling fluids where possible.

However, drilling with gas drilling fluids encounters serious difficulties in the presence of water, e.g., when the bit penetrates a water bearing formation. When the water influx is small the water wets the cuttings and the cuttings often become sticky, forming rings or balls on the drill collars and drill pipe. This causes a restriction of the gas flow, decreases the lifting capacity of the gas, and can result in complete bridging of the annulus between the drill stem and the well or bore hole wall with complete loss of cuttings removal and/or gas circulation. This is one form of cuttings coagulation which can occur in the well or bore hole. In many instances, the influx of water is sufficient to form a slurry of the cuttings and water in the bottom of the well or bore hole. This is another form of cuttings coagulation which can occur in the bore hole. The hydrostatic head of such a slurry can easily exceed the pressure of the gas in the hole and circulation of the gas is stopped.

The difficulties caused by water in wells are not confined to difficulties encountered in drilling operations. In producing natural gas wells the influx of small amounts of water is usually not too serious because the gas being produced will have sufficient lifting capacity to remove said water which can be separated from the gas in a suitable separator at the earth's surface. However, it sometimes happens that the amount of influx water is sufficient to exceed the lifting capacity of said production gas and accumulation of water is sufficient to flood the well with consequent series reductions in gas production. Such water accumulations can sometimes be removed by periodic blowing of the well, i.e., opening the well to atmospheric pressure and letting the gas blow or lift the water from the well. However, this produce is not always successful in removing all of the water and consequently the blowing becomes so frequent that it is not economical. It is thus desirable to provide other methods for removing the water from such wells.

We have found that the above-described difficulties can be overcome by introducing into the bore hole or well a salt selected from the group consisting of the ammonium, alkali metal, and alkaline earth metal salts of (a) sulfonated fused ring alkylpolynuclear aromatic compounds, (b) sulfonated extract oil obtained by the solvent extraction of a catalytically cracked heavy gas oil, and (c) sulfonated asphalt. Said salt is introduced into the well or bore hole in an amount sufficient to overcome the effects of the water in said well or bore hole. Generally speaking, in the practice of the invention, the undesirable effects of the water in the well or bore hole can be overcome in one of two ways, or a combination of both, (1) by preventing coagulation of the cuttings or (2) causing foaming of the water which is present in a slurry of said cuttings, or present otherwise, e.g., largely "free" water. In any instance, the lifting capacity of the gas exiting from the well or bore hole is maintained, and the undesirable water is removed from said well or bore hole. Thus, said salts, in effect, make possible the removal of the undesired water from the well or bore hole by maintaining the lifting capacity of the gas exiting from the well or bore hole. Thus, broadly speaking, the present invention resides in a method of servicing a well which comprises introducing at least one of said salts into said well in an amount sufficient to maintain the lifting capacity of the gas exiting from the well.

An object of this invention is to provide a method of overcoming the difficulties caused by the presence of water in a well or bore hole. Another object of this invention is to provide a method of removing water from a well or bore hole. Another object of this invention is to provide an improved method of drilling a well with a gas drilling fluid. Still another object of this invention is to provide a method of maintaining the lifting capacity of a gas stream exiting from a well. Other aspects, objects, and advantages of the invention will be apparent to those skilled in the art in view of this disclosure.

The term "fused ring alkylpolynuclear aromatic compounds" as used herein and in the claims, unless otherwise specified, includes, among others, alkylpolynuclear aromatic compounds having ring structures or systems such as those of naphthalene, dibenzofuran, dibenzothiophene, phenanthrene, fluorene, and anthracene. Said compounds contain from 1 to 4 nuclear substituted alkyl groups each containing from 1 to 16 carbon atoms, with the total number of carbon atoms in said alkyl groups not exceeding 24. The average number of alkyl groups per molecule is 2.

Said fused ring alkylpolynuclear aromatic compounds when sulfonated and the resulting sulfonic acids neutralized to prepare salts, as described hereinafter, can be represented by the following structural formulas:

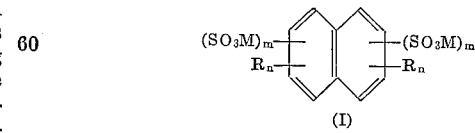

(I)

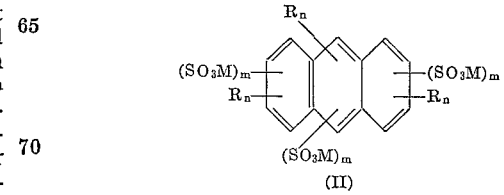

(II)

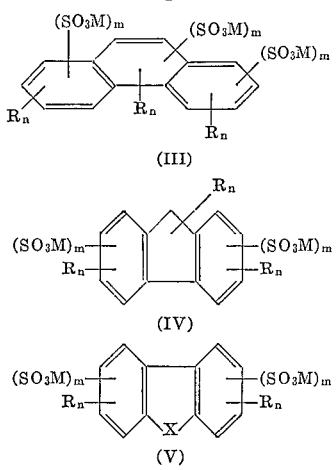

wherein R is an alkyl radical containing from 1 to 16 carbon atoms, the total number of carbon atoms in all of said alkyl radicals does not exceed 24; M is selected from the group consisting of an alkali metal, an alkaline earth metal, or ammonium; $m$ is an integer of from 0 to 2, at least one $m$ being 1 or 2; $n$ is an integer of from 0 to 4, at least one $n$ being 1 or greater; and X is selected from the group consisting of oxygen, sulfur, and nitrogen. Said nitrogen, for example, being present as a

group wherein R′ is a hydrogen atom or an alkyl radical as defined above, the total number of carbon atoms in all of the alkyl radicals in the molecule not exceeding 24.

Examples of fused ring alkylpolynuclear compounds within the scope of the above Formulas I to V include, among others, the following:

Lithium 2-methyl-5-naphthalenesulfonate
Sodium 1,4-diethyl-2,6-naphthalenedisulfonate
Potassium 1-octyl-2-methyl-4-isopropyl-8-naphthalenesulfonate
Sodium 10-methyl-1,3-anthracenedisulfonate
Ammonium 6-isobutyl-2-anthracenesulfonate
Calcium 1-propyl-2,4-anthracenedisulfonate
Sodium 9-hexyl-2-phenanthrenesulfonate
Barium 1,6-dimethyl-2,4-diethyl-7-phenanthrenesulfonate
Strontium 2-heptyl-4,9-phenanthrenedisulfonate
Sodium 2-methyl-3-fluorenesulfonate
Rubidium 2,4-dihexyl-6-fluorenesulfonate
Lithium 2,9-dimethyl-3,5-fluorenedisulfonate
Calcium 1-isopropyl-2,8-dibenzofurandisulfonate
Sodium 1,4-dimethyl-2,6-dibenzofurandisulfonate
Ammonium 2,9-diethyl-4-octyl-7-dibenzofuransulfonate
Sodium 2-pentyl-1,9-dibenzothiophenedisulfonate
Potassium 2-methyl-6-ethyl-1-dibenzothiophenesulfonate
Cesium 4-octyl-6-hexadecyl-2,8-dibenzothiophenedisulfonate
Lithium 1,9-diethyl-2-carbazolesulfonate
Sodium 2-isopropyl-1,8-carbazoledisulfonate
Calcium 3-methyl-4-hexyl-6-carbazolesulfonate All of the above-described fused ring alkylpolynuclear aromatic compounds when sulfonated and the resulting sulfonic acids neutralized to prepare salts, as described hereinafter, are useful as additive agents in the practice of the invention. However, said salts are not all equivalent. As described further hereinafter, the particular salt to be used in the practice of the invention will depend upon the conditions existing in the well to be serviced. The salts of all the above-described alkylpolynuclear compounds are readily dispersible in water or oil. However, those salts containing fewer carbon atoms in the alkyl groups, e.g., 1 to 8 carbon atoms per alkyl group and a total of not more than 12 carbon atoms in all of the alkyl groups, usually tend to be preferentially water soluble. Those salts containing more carbon atoms in the alkyl groups, e.g., 9 to 16 carbon atoms per alkyl group and a total of 13 to 24 carbon atoms in all of the alkyl groups, usually tend to be preferentially oil soluble. Said salts which usually tend to be preferentially oil soluble are particularly useful in combating or overcoming the type of coagulation which occurs when only a small amount of water is present in the bore hole and the cuttings tend to ball or form rings in the bore hole, and are sometimes referred to as "anti-balling agents" in that they tend to make the cuttings water repellent.

Those salts which usually tend to be preferentially water soluble are particularly useful in combating the type of coagulation which occurs when a greater amount of water is present, e.g., sufficient to form a slurry of the cuttings and/or other solids in the bottom of the bore hole or well. Said last-mentioned salts constitute a presently preferred subgroup of the additive agents of the invention. The conditions where sufficient water is present in the well or bore hole to form a slurry of the cuttings is more common than those conditions wherein there is present only a small amount of water sufficient to cause the form of coagulation referred to as balling or bridging. When sufficient water is present to form a slurry of the cuttings or to be present largely as free water, said water is removed by forming a foam, as discussed further hereinafter. Because of their greater solubility in water, salts of the invention which usually tend to be preferentially water soluble are usually more efficient foaming agents.

A convenient and presently preferred source of the above-described fused ring alkylpolynuclear aromatic compounds, which when sulfonated give the above-described salts which usually tend to be preferentially water soluble, is an extract oil obtained by the solvent extraction of a catalytically cracked heavy gas oil (sometimes referred to as cycle oil). Any suitable solvent, such as liquid sulfur dioxide, furfural, phenol, etc., can be employed in solvent extracting said gas oil. Liquid sulfur dioxide is a presently preferred solvent.

Said extract oil can be prepared in any of a number of suitable methods. In one method, starting with a crude oil such as mixed base Mid-Continent crude oil, the crude oil is first distilled to obtain a gas oil having a gravity typically between about 22 and about 33° API and typically boiling within the range of about 500 to about 900° F., and a topped crude having a boiling range above about 900° F. Said topped crude is vacuum distilled at a pressure within the range of about 0.5 to about 15 millimeters of mercury and at a temperature within the range of about 625 to about 735° F. to obtain a second gas oil typically boiling within the range of about 750 to about 1050° F. According to one method for preparing the extract oil used in the practice of the invention, said first and second gas oils can be combined and charged to a conventional fluid type catalytic cracking unit for the production of a cracked heavy gas oil which is then treated as described further hereinafter. If desired, a portion of said topped crude can be included with said gas oils in the charge to said catalytic cracking unit. In such instances said topped crude can comprise up to about 40 volume percent of the charge to said catalytic cracking unit.

According to another method for the preparation of the extract oil used in the practice of the invention, said topped crude is passed to a vis-breaking operation. As is well known to those skilled in the art, a vis-breaking operation comprises a short time decomposition, usually conducted at low cracking temperatures (about 700 to 870° F.), for the purpose of reducing the viscosity or pour point of a heavy straight run oil. The vis-broken topped crude is then vacuum distilled at a pressure within the range of about 0.1 to about 10 millimeters of mercury and at a temperature within the range of about 650 to 750° F. to obtain a third gas oil having a gravity typically between about 12 and about 23° API and typically boiling within the range of about 725 to about 1150° F. If desired, said third gas oil can be combined with said first and second gas oils to form the combined charge to said catalytic cracking unit. Again, if desired, some of the original topped crude can be included in said combined charge in about the same ratio as set forth above and charged to said catalytic cracking unit.

The charge to said catalytic cracking unit, obtained by one of the methods outlined above, is cracked in said unit under conditions to cause the dehydrogenation of naphthenes. The conditions usually employed in the reactor of said cracking unit are, generally speaking, conventional, and are from about 5 to about 20 p.s.i.g. pressure, from about 875 to about 925° F., and a catalyst-to-oil weight ratio within the range of 2:1 to 10:1. In addition to the gasoline and other fractions which are obtained from said catalytic cracking unit, there are obtained a heavy cycle oil having a typical gravity of about 28° API and typically boiling witin the range of about 500 to about 800° F. and a decant oil boiling within the range of about 600 to about 1000° F. Said heavy cycle oil and said decant oil are combined to form what is referred to herein and in the claims as a catalytically cracked heavy gas oil. Said cracked heavy gas oil typically has a gravity of about 25 to about 26° API.

Said cracked heavy gas oil is then charged to a solvent extraction unit wherein it is contacted with a liquid sulfur dioxide solvent, for example, under generally conventional conditions. In said solvent extraction tower the top tower temperature is usually maintained at a temperature of about 90 to about 100° F. and the bottom tower temperature is usually maintained at a temperature within the range of about 95° F. to 105° F. Liquid sulfur dioxide is charged to said extraction tower at a rate of about 0.6 to 0.9, usually 0.75 barrels of sulfur dioxide per barrel of charge oil. Extract phase from said solvent extraction tower is then distilled for the removal of solvent and the recovery of the extract oil.

A typical extract oil prepared substantially as described above had the following properties:

TABLE I

| | |
|---|---|
| Sulfur, wt. percent | 1.6 |
| Refractive index (20° C.) | 1.5900 |
| Density, grams per cc. | 0.995 |
| Atomic ratio of carbon to hydrogen | 0.812 |
| Weight percent nitrogen (Dumas method) | 0.16 |
| Pour point, ° F. | 35 |
| Aniline point, ° F. | 66.8 |
| Carbon residue, wt. percent | 2.53 |
| Bureau of Mines correlation index | 92 |
| Volume percent non-aromatic material | 24.8 |
| Molecular weight (ebulliscopic method) | 230 |

Typical other properties of extract oils prepared substantially as described above are: boiling range within the range of 400 to 1000° F.; API gravity within the range of 5 to 15; viscosity, SUS at 100° F., 70 to 90; viscosity, SUS at 210° F., 30 to 40; and Bureau of Mines correlation index 80 to 110.

Said extract oils when sulfonated and the resulting sulfonic acids neutralized in accordance with the invention yield salts which form a presently more preferred subgroup of the additives which can be used in the practice of the invention. Said salts will have a molecular weight within the range of from about 230 to about 950. Those salts having a molecular weight within the range of from about 300 to about 600 are presently preferred for use in the practice of the invention.

Oils such as said extract oils can be analyzed for determination of aromatic ring systems contained therein by a method comprising contacting the oil with thiourea to form a solid adduct. According to said method the oil is contacted in conventional mixing equipment with an excess of thiourea in the presence of a suitable solvent for said thiourea, such as ethanol. The resulting adduct is separated, as by filtration, and washed with a non-adducting hydrocarbon. The washed adduct is decomposed by adding an excess of water which dissolves the thiourea, thus destroying the adduct and freeing the adducted compounds. Said adducted compounds are separated by decantation or other suitable means. The separated adducted compounds can then be analyzed by gas chromatography, infrared, nuclear magnetic resonance, and other known methods, and the structural details of the ring systems calculated from these results and the results of elemental analysis and molecular weight determinations.

Based on analysis of typical extract oils such as the one set forth in Table I above, in accordance with the above-described thiourea adduction process, the relative weight percent of aromatic ring systems which have been identified in an extract oil suitable for use in preparing the additive agents of the invention are as follows:

| Ring system: | Relative wt. percent |
|---|---|
| Naphthalene | 5 to 25 |
| Dibenzofuran | 1 to 7 |
| Dibenzothiophene | 5 to 20 |
| Phenanthrene | 15 to 50 |
| Fluorene | 5 to 15 |
| Anthracene | 1 to 7 |

Since said extract oil contained 0.16 weight percent nitrogen, it is considered likely that at least some of the nitrogen is present in an aromatic ring system, for example, a carbazole ring system.

The term "asphalt" or "asphaltic material" as used in this specification and in the appended claims, unless otherwise specified, is meant to cover dark brown to black semi-solid or solid cementitious hydrocarbon material which is completely or substantially soluble in carbon disulfide, in which material bitumens are the sole or predominant constituent, these materials occurring in nature as such or being obtained by refining petroleum by distillation, precipitation, cracking, oxidation, or similar operations. The terms "sulfonated asphalt" and "sulfonated asphaltic material" as used in this specification and appended claims, unless otherwise specified, are meant to cover the ammonium, the alkali metal, and the alkaline earth metal salts of asphalt that has been sulfonated with a sulfonation agent, such as oleum. Asphaltic materials useful in preparing the sulfonates of this invention representatively include asphaltenes, maltenes, blown asphalt, straight residual oils, distillation residues, still bottoms, cracking residues, asphaltic bitumens, and the like.

In accordance with the invention, said fused ring alkylpolynuclear aromatic compounds, said extract oil obtained by solvent extraction of a catalytically cracked heavy gas oil, and said asphalt or asphaltic material are sulfonated, and the salts obtained by neutralizing the resulting sulfonic acids are the additive agents of the invention.

In preparing the sulfonates of this invention, the asphaltic starting material can have a semi-solid or solid consistency and is preferably in a granulated, pulverized, or finely divided form. The asphaltic starting material, the alkylpolynuclear aromatic compound starting material, or the extract oil starting material can be preliminarily dissolved in a suitable non-sulfonateable, non-aromatic, diluent such as carbon tetrachloride, chloroform, pentane, n-hexane, octanes, gasoline, kerosene, cyclohexane, diesel fuel, and the like. A particularly suitable diluent in many cases, especially if the sulfonating agent is sulfur trioxide, is liquid sulfur dioxide. The diluent can be added serially to the starting material before sulfonation and further amounts may be added after sulfonation, if desired. The diluent can be separated from the sulfonation mixture by distillation, simple warming or heating, or extraction with suitable non-polar solvents.

Sulfonation temperatures are usually controlled within the range of about −50 to 250° F., with the preferred operating range being between −30 and 100° F. Lower temperatures are somewhat preferred since above about 200° F. excessive oxidation with liberation of sulfur dioxide may take place. The starting material-sulfonating agent weight ratio will vary with the sulfonation temperature and starting material. When said starting material is asphaltic material said ratio generally will be in the range from 1:0.12 to 1:1. When said starting material is an alkylpolynuclear aromatic compound or compounds, or said extract oil, said ratio generally will be in the range of from 1:4.5 to 6:1. The sulfonation reaction is usually carried out at atmospheric pressure although pressures greater or less than atmospheric can be employed if desired.

Sulfonating agents which can be utilized in the sulfonation step include fuming sulfuric acid, chlorosulfonic acid, concentrated sulfuric acid, and sulfur trioxide. The fuming sulfuric acid can vary from about 10 to 40 weight percent excess $SO_3$; however, we prefer to use commercial fuming sulfuric acid which has about 20 weight percent excess $SO_3$, this type of fuming sufuric acid being known as oleum.

In the practice of this invention, oleum and anhydrous $SO_3$ are the preferred sulfonating agents. The sulfonating agent is preferably added dropwise or in increments to the starting material with stirring or agitation. The sulfonation reaction can be stopped by the addition of water to the reaction mixture.

As pointed out hereinbefore, in many cases it would be desirable to separate the diluent from the reaction mixture after the sulfonation step; this separation can be accomplished by distilling off the diluent, or it can be accomplished by extraction, simple heating, or stripping, for example, with air. Prior to the neutralization of the resulting sulfonic acids, excess $SO_2$ can be removed from the reaction mixture in any convenient manner, for example, by simple warming or by stripping with air. If desired, water can be added to said reaction mixture before said warming or stripping step.

The sulfonation reaction mixture can then be directly neutralized or can first be preliminary separated by filtration of the like into a sulfonic acid phase and a sludge phase containing unreacted starting material.

The sulfonic acids are neutralized by contacting them with anhydrous or aqueous ammonia, or an aqueous solution or slurry of an alkali or alkaline earth metal salt, oxide, or hydroxide, thereby converting the sulfonic acids to the corresponding ammonia or metal sulfonates. Metals which are particularly suitable for preparing the sulfonates of this invention include the alkali metals such as sodium and potassium and the alkaline earth metal calcium. The preferred sulfonates of this invention are the ammonium, sodium, and calcium sulfonates. As used herein and in the claims, unless otherwise specified, the term "alkali metals" includes sodium, potassium, lithium, rubidium, and cesium; and the term "alkaline earth metals" includes calcium, barium, and strontium.

The neutralization step can be conveniently carried out over a wide temperature range, e.g., 0 to 240° F., preferably at room temperature, and at a pressure preferably sufficient to prevent evaporation of the volatile materials present. Repeated amounts of the neutralizing agent can be added so as to insure complete neutralization. Both before and after neutralization it is desirable in many cases to strip off any $SO_2$ remaining in the sulfonation mixture. In many cases it may be desirable to strip off the aforementioned diluent after the neutralization step, as mentioned hereinbefore. It is also within the scope of this invention to use a combination of neutralizing agents; for example, the sulfonic acids can be neutralized with first anhydrous ammonia and then sodium hydroxide, or first sodium hydroxide and then anhydrous ammonia. After neutralization, the pH of the neutralized mixture can be adjusted, if necessary, for example by adding concentrated sulfuric acid.

After the neutralization step, the neutralized mixture can be allowed to settle and then separated, for example, by decantation, centrifugation, filtration, or the like, to separate the sulfonate from sludge or other unreacted material. If desired, particularly when using the extract oil as starting material, the neutralized mixture can be extracted with a suitable solvent such as n-pentane to remove any unsulfonated oil. The remaining aqueous solution is then evaporated to dryness to obtain the sulfonated product. In some cases, depending upon the particular starting material utilized, the sulfonation and neutralization can be carried out under substantially dry or anhydrous conditions. The resultant sulfonate product can be dried or diluted with water or oil.

The sulfonates of the invention have a wide range of dispersibility in water and oil, that is, depending on the nature of the starting material, the degree of sulfonation and neutralization, etc., these materials will form true solutions, colloidal and super colloidal suspensions, and suspensions in which the sulfonates are relatively insoluble though finely divided and dispersible.

In the practice of the invention, the sulfonate additive agents of the invention can be employed in amounts extending over a wide range and in any suitable manner for introducing the additive agents into the well or bore hole at the region where the water is causing difficulties. A primary objective of the invention is to "dry" or clean the bore hole, i.e., remove the undesired water, and cuttings and/or other solids which may be present. To do this the lifting capacity of the gas exiting from the well or bore hole must be maintained. Thus, in all instances, the amount of additive agent which is used in the practice of the invention is an amount sufficient to maintain the lifting capacity of the gas exiting from the well or bore hole, i.e., an amount sufficient to overcome the impeding effect or action of the water in the bore hole. Generally speaking, the amounts of additive agent used will be within the range of from 0.05 to 20, more usually 0.1 to 5, pounds per barrel of water present or entering the well or bore hole. It is, however, within the scope of the invention to use amounts outside of said broad range.

In gas drilling operation the problem of water influx into the bore hole can be divided into three broad categories, (1) small amounts from so-called "weeping" formations, usually less than 2 barrels per hour, (2) intermidate quantities, usually in the range of from 2 to 100 barrels per hour but sometimes, depending upon the particular formation or formations penetrated, as much as 500 barrels per hour, which can be economical removed with gas if the lifting capacity of the gas can be improved, and (3) excessive quantities which from both a practical and economical standpoint dictate conversion to conventional mud drilling.

In normal gas drilling of dry formations the cuttings are removed as dust suspended in the gas exiting from the well. Influx of water into the bore hole will cause coagulation of said cuttings. In general, there are two types of cuttings coagulation, depending upon the amount of water in the bore hole, (1) balling or ring forming caused by the presence of small amounts of water and (2) the forming of a slurry caused by the presence of intermediate quantities of water. Thus, the terms "coagulate" or "coagulation" as used herein and in the claims, unless otherwise specified, refers to a change in state of at least a part of the cuttings from a suspension in gas (as in normal operations) into a thickened mass, either a solid or a semi-solid, or a slurry.

Bore hole dampness or the presence of small quantities of influx water is often first noted by a change in one or more of the following conditions (a) amount of dust in the exit gas, (b) increase in water vapor content of exit gas, and (c) a restriction in the well bore indicated by an increase in pressure, increase in torque, or drag on the drill collars and bit. To overcome these undesirable effects of the water, injection of an additive agent of the invention should be started immediately upon noticing the presence of water. Any suitable method for injecting said agent can be employed. One method which can be employed when there has been only a reduction in the amount of dust is to inject the additive in dry powdered form by dispering same in the injection gas. The additive agent will tend to coat the cuttings and make same water repellent. Those additive agents of the invention which are preferentially oil soluble are preferred for use in accordance with this method.

Another method which can be employed is to disperse the additive in water and then inject or disperse said water into the input gas. In carrying out this method, the additive agent is dispersed in said water in any suitable amount, preferably within the above-stated ranges (0.05 to 20 lbs./bbl. of water), and the additive containing water is injected with the input gas down the drill stem in an amount which is usually within the range of 1 to 2 barrels per hour, but which can be greater if desired or necessary. Agitation of the additive containing water in the bore hole causes foaming, the foam forms a "light" column in the annulus which the exiting gas can lift, and the cuttings are removed by the foam. Seepage water may sometimes cause sufficient coagulation of the bore hole or ring forming type to substantially stop gas flow before an additive can be injected. Said method of dispersing the additive in water and then injecting the additive containing water is particularly advantageous in this instance. This method is frequently preferred by many operators over the method of injecting the additive agent as a dry solid. When properly employed this method will insure a "clean" hole. When the additive is injected as a dispersion in water, those salts which are preferentially water soluble are preferred.

When an intermediate quantity of water is encountered, there will usually be an immediate cessation of dust flow. In such instances one frequently preferred method for injecting the additive is to disperse same as a dry powdered solid into the injection gas. Another method is the above-described method of first dispersing the additive agent in water as described above. However, there is frequently no need to inject additional quantities of water because there will already be sufficient water in the bore hole. Agitation caused by the injection gas passing through the water will cause the foaming agent to exert its foaming action on said water. By creating a foam the column of water or slurry is lightened and the available gas pressure can lift said water or slurry from the bore hole.

In all of the above instances, the amount of additive which is used will depend upon the lithology, the well depth, water influx rate, and the desired penetration rate.

As mentioned above, the invention can be employed to restore production in producing wells which have become flooded by water. The presence of water in such wells is usually indicated by pulsations in flow or a marked decrease in gas production. The quantity of water in the well can be determined by liquid level measurements in known manner. The desired amount of the additive agent is then introduced into the well, usually dispersed in water for convenience, and the contents of the well agitated by permitting a small amount of gas to escape to the atmosphere. Said gas bubbling through the well contents will agitate same and cause the formation of foam. Mixing of the well contents can also be effected by agitating same with a rod or bailer on a suitable wire line operated through a suitable well head. After sufficient agitation, usually from 30 minutes to 2 hours depending upon the depth, amount of water in the well, etc., the well is opened to the atmosphere or otherwise permitted to "blow." Foam production from the well will usually start almost immediately and the well will be free of water in from 30 minutes to 2 hours, depending upon well depth, the amount of water present, etc. This treatment can be repeated periodically as necessary. If desired, continuous injection of the additive can be employed and the produced gas carrying the foam passed through a separator to break the foam. This method is particularly advantageous where the additive can be introduced into the annulus between the tubing and the casing and the gas produced through the tubing.

The following examples will serve to further illustrate the invention.

Example I

Sulfonation of a sulfur dioxide extract oil, having the properties set forth in Table I above, was carried out by first adding dropwise over a period of 15 minutes 101.3 grams of said oil to 500 ml. of liquid sulfur dioxide in a one-liter flask cooled by dry ice. Liquid sulfur trioxide (71.0 grams) was then added dropwise over a period of ten minutes to the resulting cold solution. Both additions were carried out with stirring. Stirring was continued while the reaction mixture was permitted to warm to room temperature. Then, 300 ml. of water was added, and the remaining sulfur dioxide was expelled by heating. Said reaction mixture was then neutralized to a pH of 8 by addition of an aqueous solution of sodium hydroxide. The neutralized reaction mixture was then extracted with n-pentane to remove any unsulfonated oil. The remaining aqueous solution was then evaporated to dryness to give 166 grams of residue consisting essentially of the desired sulfonated sulfur dioxide extract oil.

The molecular weight of the thus sulfonated and neutralized extract oil (sodium salt) was calculated to be approximately 400. Sulfur analysis of said salt shows there are from 1 to 2 (an average of 1.5) sulfonate groups per molecule.

Example II

A series of test runs was carried out under comparable conditions to compare the foaming ability of the sodium extract oil sulfonate prepared in Example I with Afrox (polyoxyethylated fatty alcohol), a commercially available air drilling foaming agent. Said runs were carried out employing a model well comprising a six-foot section of four-inch I.D. Pyrex pipe fitted at the bottom for introduction of compressed air. In each run a slurry prepared by mixing 300 grams of McCracken clay with 1000 milliliters of distilled water for 2 minutes in a Waring Blendor was placed in the model well. Said slurry occupied about six inches in the bottom of the well. In each run compressed air was started through the slurry and the foaming agent and other materials added thereto as given below.

In one run Afrox was added incrementally to determine the amount required to produce sufficient foam to flow over the top of the column. It was found that 36 grams of Afrox were required to accomplish this. At this point 15 grams of powdered calcium hydroxide was added to the foam. This reduced the foam level to about 6 inches from the top of the column. Subsequent addition of 75 grams of powdered sodium chloride caused the foam level to be lowered to the middle of the column. Afrox was again introduced into the column incrementally and it was found that an additional 9 grams was required to cause the foam to flow over the top of the column. After an addition of another 11.25 grams of Afrox, the addition of 2 to 3 milliliters of No. 2 diesel oil caused the foam to collapse completely.

In another run using another batch of the same type slurry and substantially the same air flow rate, it was found that only 5 grams of the sodium extract oil sulfonate, prepared as described in Example I, was required to produce sufficient foam to flow over the top of the column. The addition of 15 grams of powdered calcium hydroxide at this time caused the foam level to be lowered to the middle of the column. However, the subsequent addition of 75 grams of powdered sodium chloride caused no further decrease in the foam level. At this point it was found that only 7 grams of the sodium extract oil sulfonate of Example I was required to cause the foam to again flow over the top of the column. After the further addition of 3 grams of the sodium extract oil sulfonate, it was found that 8 to 9 milliliters of diesel fuel was required to lower the foam level about 6 inches below the top of the column.

The above runs demonstrate the superior foaming properties of said sodium extract oil sulfonate in fresh water, in salt water, and in the presence of other contaminants such as oil and calcium ions which are frequently encountered in air and gas drilling operations.

For example, only 5 grams of the sodium extract oil sulfonate produced at least as much foam in fresh water as did 36 grams of the Afrox foaming agent. Furthermore, the foam produced by the additive of the invention was not affected by the presence of salt and was only slightly affected by the presence of oil, whereas the foam produced by the Afrox foaming agent was completely collapsed by the oil.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. In a well wherein an operation is being carried out which comprises removing a stream of gas from said well and the lifting capacity of said gas is reduced by the presence of water in said well, the method of servicing said well, which method comprises introducing into said well, in an amount sufficient to maintain the lifting capacity of said gas, a salt selected from the group consisting of ammonium, alkali metal, and alkaline earth metal salts of (a) sulfonated extract oil obtained by the solvent extraction of a catalytically cracked heavy gas oil, having a molecular weight within the range of from about 300 to about 600, and (b) sulfonated asphalt.

2. A method of servicing a well to overcome the effects of undesired water present in said well, which method comprises: forming a mixture by adding to said water, in an amount sufficient to cause foaming of said water when it is agitated, a foaming agent selected from the group consisting of ammonium, alkali metal, and alkaline earth metal salts of (a) sulfonated extract oil obtained by the solvent extraction of a catalytically cracked heavy gas oil, having a molecular weight within the range of from about 300 to about 600, and (b) sulfonated asphalt; agitating said mixture to cause the formation of foam; and removing said foam from said well.

3. In a process of drilling a well with well drilling tools, the step of circulating in said well a gas having dispersed therein, an amount sufficient to overcome the impeding effects of water encountered in said drilling operations on the removal of cuttings from said well by said gas, a salt selected from the group consisting of ammonium, alkali metal, and alkaline earth metal salts of (a) sulfonated extract oil obtained by the solvent extraction of a catalytically cracked heavy gas oil, having a molecular weight within the range of from about 300 to about 600, and (b) sulfonated asphalt.

4. A process according to claim 3 wherein said salt is a salt of sulfonated extract oil obtained by the solvent extraction of a catalytically cracked heavy gas oil.

5. A process according to claim 3 wherein said salt is a salt of sulfonated asphalt.

6. In a process of drilling a well wherein cuttings are removed from said well by circulating therein a gas, and wherein balling of said cuttings is encountered, the improvement which comprises dispersing in said gas, in an amount sufficient to overcome said balling of cuttings, a finely divided dry salt selected from the group consisting of ammonium, alkali metal, and alkaline earth metal salts of (a) sulfonated extract oil obtained by the solvent extraction of a catalytically cracked heavy gas oil, having a molecular weight within the range of from about 300 to about 600, and (b) sulfonated asphalt.

7. In a process of drilling a bore hole wherein cuttings are removed from said bore hole by circulating therein a gas, and wherein the removal of said cuttings is impeded by the presence of water in said bore hole, the improvement which comprises dispersing in said gas, in an amount sufficient to overcome the impeding effects of said water, a salt selected from the group consisting of ammonium, alkali metal, and alkaline earth metal salts of (a) sulfonated extract oil obtained by the solvent extraction of a catalytically cracked heavy gas oil, having a molecular weight within the range of from about 300 to about 600, and (b) sulfonated asphalt.

8. A process according to claim 7 wherein said salt is dispersed in said gas in the form of a finely divided solid.

9. A process according to claim 7 wherein said salt is first dispersed in water and the resulting dispersion is then dispersed in said gas.

10. A method of drilling a bore hole with drilling tools through earth formations including a water bearing formation, which method comprises: drilling a portion of said bore hole while circulating therein a gas to remove cuttings formed during said drilling; then, when said water bearing formation is penetrated, dispersing in said gas, in an amount of from 0.05 to 20 pounds per barrel of water entering said bore hole from said water bearing formation, a salt selected from the group consisting of ammonium, alkali metal, and alkaline earth metal salts of (a) sulfonated extract oil obtained by the solvent extraction of a catalytically cracked heavy gas oil, having a molecular weight within the range of from about 300 to about 600, and (b) sulfonated asphalt; and continuing drilling said bore hole while circulating said gas having said salt dispersed therein.

11. A method according to claim 10 wherein said salt is the sodium salt of sulfonated extract oil obtained by the solvent extraction of a catalytically cracked heavy gas oil.

12. A method according to claim 10 wherein said salt is the calcium salt of sulfonated extract oil obtained by the solvent extraction of a catalytically cracked heavy gas oil.

13. In a process of drilling a bore hole wherein cuttings are removed from said bore hole by circulating therein a gas, and wherein the removal of said cuttings is impeded by the presence of water in said bore hole, the improvement which comprises dispersing sodium sulfonated asphalt in said gas in an amount sufficient to overcome the impeding effects of said water.

References Cited by the Examiner

UNITED STATES PATENTS

| | | | |
|---|---|---|---|
| 3,070,165 | 12/1962 | Stratton | 252—8.55 |
| 3,073,387 | 1/1963 | Dunning et al. | 166—43 X |
| 3,111,178 | 11/1963 | Marsh et al. | 166—42 X |
| 3,111,998 | 11/1963 | Crowley | 175—68 |
| 3,130,798 | 4/1964 | Schramm et al. | 175—69 |
| 3,155,178 | 11/1964 | Kirkpatrick et al. | 166—45 X |

FOREIGN PATENTS

| | | |
|---|---|---|
| 274,611 | 7/1927 | Great Britain. |
| 289,630 | 5/1928 | Great Britain. |
| 539,281 | 9/1941 | Great Britain. |

OTHER REFERENCES

Schwartz, A. M. and Perry, J. W. Surface Active Agents, N.Y. Interscience, 1949, chapter 5, pages 111–131 and chapter 28, pages 514 and 515. TP 149 S3 c. 6.

Randall et al.: Stearates, foaming agents combat water in air or gas drilling. In the Oil and Gas Journal, pages 78–83, November 3, 1958.

CHARLES E. O'CONNELL, *Primary Examiner.*